United States Patent
Palfer-Sollier et al.

(10) Patent No.: US 12,399,831 B2
(45) Date of Patent: Aug. 26, 2025

(54) SNOOP FILTER SCALABILITY

(71) Applicant: Numascale AS, Oslo (NO)

(72) Inventors: Thibaut Palfer-Sollier, Oslo (NO); Steffen Persvold, Oslo (NO); Helge Simonsen, Oslo (NO); Mario Lodde, Borore (IT); Thomas Moen, Oslo (NO); Einar Rustad, Oslo (NO); Goutam Debnath, Beaverton, OR (US); Kai Arne Midjås, Vinterbro (NO)

(73) Assignee: NUMASCALE AS, Oslo (NO)

( * ) Notice: Subject to any disclaimer, the term of this patent is extended or adjusted under 35 U.S.C. 154(b) by 0 days.

(21) Appl. No.: 18/837,493

(22) PCT Filed: Feb. 9, 2023

(86) PCT No.: PCT/NO2023/050031
§ 371 (c)(1),
(2) Date: Aug. 9, 2024

(87) PCT Pub. No.: WO2023/153937
PCT Pub. Date: Aug. 17, 2023

(65) Prior Publication Data
US 2025/0110880 A1    Apr. 3, 2025

(30) Foreign Application Priority Data
Feb. 10, 2022    (NO) .................................. 20220189

(51) Int. Cl.
*G06F 12/0831* (2016.01)
*G06F 12/0846* (2016.01)

(52) U.S. Cl.
CPC ...... *G06F 12/0831* (2013.01); *G06F 12/0846* (2013.01)

(58) Field of Classification Search
CPC .................. G06F 12/0831; G06F 12/0846
See application file for complete search history.

(56) References Cited

U.S. PATENT DOCUMENTS

| | | | |
|---|---|---|---|
| 9,575,893 B2 * | 2/2017 | Lin | ................... G06F 12/0824 |
| 12,093,177 B2 * | 9/2024 | Loison | ................ G06F 12/0607 |
| 2006/0224740 A1 | 10/2006 | Sievers-Tostes et al. | |
| 2006/0224835 A1 * | 10/2006 | Blumrich | ............ G06F 12/0831 |
| | | | 711/146 |
| 2013/0318308 A1 | 11/2013 | Jayasimha et al. | |
| 2016/0117249 A1 | 4/2016 | Lin et al. | |

(Continued)

OTHER PUBLICATIONS

International Search Report issued in corresponding International Application No. PCT/NO2023/050031, mailed on Jun. 2, 2023 (4 pages).

(Continued)

*Primary Examiner* — Aracelis Ruiz
(74) *Attorney, Agent, or Firm* — Osha Bergman Watanabe & Burton LLP

(57) ABSTRACT

The invention relates to a snoop filter device, a node controller, a multicomponent computer system, a computer-implemented method, a data processing system and a computer-readable storage medium aiming at enabling improved tracking of a scalable number of cache elements in multi-processor systems. The invention involves scaling of a snoop filter device according to the number of cache elements that it is desirable to track.

14 Claims, 9 Drawing Sheets

(56) References Cited

U.S. PATENT DOCUMENTS

2017/0286299 A1\* 10/2017 Sury .................. G06F 12/0811
2021/0294743 A1  9/2021 Randall et al.

OTHER PUBLICATIONS

Written Opinion issued in corresponding International Application No. PCT/NO2023/050031, mailed on Jun. 2, 2023 (5 pages).
Search Report issued in counterpart Norwegian Patent Application No. 20220189 mailed on Sep. 9, 2022 (2 pages).

\* cited by examiner

SNOOP FILTER SCALABILITY

TECHNICAL FIELD

The disclosure relates to a snoop filter device, a node controller, a multicomponent computer system, a computer-implemented method, a data processing system and a computer-readable storage medium, aiming at enabling improved tracking of a scalable number of cache elements in multiprocessor systems.

BACKGROUND

Efficiently maintaining cache coherence is a central requirement for obtaining high performance shared memory multiprocessor systems.

Shared memory multiprocessor systems usually contain one or more shared main memory agents in addition to a series of local memory agents, called cache agents, or just cache. The cache agents may belong to a local processor or a node of processors and are characterized by their high speed and small size compared with main memory. Storing data in a local cache agent that e.g., belongs to a working set of a local CPU will thus largely improve the overall performance of the multiprocessor system as the frequently used data in the working set can be more quickly accessed by the local CPU.

Having a series of local cache agents, each holding data locally, gives rise to the problem with how to maintain cache coherence. If a CPU modifies a cache line in a local cache agent through e.g., a write-operation, other cache agents holding a copy of the same cache line will be unaware of this write operation, and their copy of the respective cache line will consequently be out of date. These out-of-date cache lines may then be defined as stale.

To obtain cache coherence, i.e., eliminating stale data, a wide variety of techniques and procedures have been implemented. This involves implementing a variety of cache coherence protocols, like the MSI, MESI, MOESI protocols, as well as implementing a variety of cache coherence mechanisms, including directory-based cache coherence mechanisms as well as snoopy bus-based methods.

Snoopy bus-based methods usually involve what is called a snooper that snoops all the transactions that are being communicated across one or more connections between various agents in the multiprocessor system, e.g., across a bus, and updates the local cache accordingly. The snooper may belong to a node controller, a cache agent, or cache element, and the connections may run between various agents in the computer system, including cache agents, cache nodes, cache elements, CPUs etc. Whenever a transaction that modifies a cache line is being communicated, the snooper snoops this transaction, checks whether any of its respective agents hold a copy of this cache line, and modifies the cache line according to the transaction communicated across the bus.

The main mechanism to achieve cache coherence today is directory-based. Directory based cache coherence implies that directories are used to manage caches in place of snoopy methods due to the snoopy mechanisms' poor scalability due to the use of. Directory-based coherence avoids broadcast by storing information about the status of an address in a "directory". The directory entry for a cache line contains information about the state of the cache line in all caches. Caches look up information from the directory as necessary- Cache coherence is maintained by point-to-point messages between the caches (not by broadcast mechanisms).

The concept of a snoop filter has been developed in order to improve on the efficiency of snoopy based cache coherence mechanisms and directory-based cache coherence mechanisms. A snoop filter is a directory-based structure that maintains information regarding the coherence state of a series of cache lines stored in the cache. In a multi-processor system, a snoop filter may for example monitor the bus traffic and filter out the transactions on the bus not relating to a cache line that is stored in the appurtenant cache element. This results in the snooper having to perform fewer power and time-consuming lookups, and hence improves the efficiency of the snoopy based cache coherence mechanism.

A snoop filter is commonly structured to maintain information in a series of entries, where each entry comprises a tag and one or more additional bits related to the appurtenant tag. The tag is a unique identifier of a cache line while the additional bits e.g., may indicate the state of a cache line identified by the tag. The additional bit/bits may as an example make up one or more presence vectors, each containing information regarding whether the cache line identified by the tag is stored in the cache, and optionally where in the cache, or in which cache element the cache line is stored.

A snoop filter may be incorporated in a node controller that may be connected to a variable number of cache elements. For the node controller to function when connected to different number of cache elements, the node controller needs to be able to track a variable number of cache elements in its snoop filter. This has historically been achieved in two ways: either by scaling the presence vector in each snoop filter entry according to the number of cache elements tracked, or to let each presence vector represent multiple cache elements.

The scaling approach involving scaling of the presence vectors comes with the drawback that the amount of scaling that can be performed is limited and that scaling of the presence vectors result in damaging of the address capabilities of each snoop filter entry. Letting each presence vector represent more than one cache element comes on the other hand with the drawback of a significant loss in precision for how accurately the snoop filter can track a cache element.

It is the goal of the present invention to improve on the structure of a snoop filter to enable improved tracking of a variable number of cache elements.

SUMMARY OF THE INVENTION

In a first aspect of the invention, the invention provides a snoop filter device for being organized in order to track a variable C number of cache elements, where the snoop filter device comprises an $S_i$ number of initial snoop filter instances, the snoop filter device is connectable to a C number of cache elements, the snoop filter device is configured to be organized, when the snoop filter device is connected to the C number of cache elements, by grouping initial snoop filter instances together into an $S_f$ number of final snoop filter instances, each initial snoop filter instance comprises an $L_f$ number of snoop filter storage locations organized in an $n_i$-way set associative manner with an $m_i$ number of sets and an $n_i$ number of storage locations per set, such that $L_i$ equals $m_i \cdot n_i$, each final snoop filter instance comprises an $L_f$ number of snoop filter storage locations organized in an $n_f$-way set associative manner with an mf number of sets and an $n_f$ number of storage locations per set, such that $L_f$ equals $m_f \cdot n_f$, and where each snoop filter storage location is configured to store a tag identifying a cache line storable in a cache element, and to store a P number of presence vectors, each presence vector containing information regarding the presence of the cache line identified by the tag, where the product $S_f \cdot m_f \cdot n_f$ equals the product $S_i \cdot m_i \cdot n_i$, where $S_f \leq S_i$ and where $S_f$ equals C/P, According to one embodiment of the invention each cache line comprises a cache line address comprising a given tag and a given k bit cache line index, and any snoop filter instance of the snoop filter device, when $2k > m_f$ is configured to store the given tag in a set indicated by the $\log_2 (m_f)$ least or most significant bits of the given k bit cache line index.

According to another embodiment of the invention $P \leq 16$.

According to yet another embodiment of the invention $P=1$ or $P=2$.

According to yet another embodiment of the invention $S_f \geq 2$, each snoop filter instance among the Sf final snoop filter instances is configured to store the same tag in one if its storage locations, and each of the storage locations of the snoop filter device that stores the same tag are configured to store different presence vector/vectors.

According to yet another embodiment of the invention each snoop filter storage location is mapped to one cache element.

According to yet another embodiment of the invention each presence vector comprises several presence bits, and the number of presence bits is equal to a number of bits required to write a cache element identifier plus one additional bit.

According to yet another embodiment of the invention each presence vector consists of one presence bit.

In a second aspect of the invention, the invention provides a node controller comprising a snoop filter device according to the first aspect of the invention.

In a third aspect of the invention, the invention provides a multicomponent computer system comprising: a C number of cache elements, and a snoop filter device connected with the C cache elements, or a node controller where the snoop filter device of the node controller is connected with the C cache elements.

In a fourth aspect of the invention, the invention provides a computer-implemented method comprising the step of: organizing a snoop filter device according to the first aspect of the invention, when the snoop filter device is connected to a C number of cache elements, such that the product $S_f \cdot m_f \cdot n_f$ equals the product $S_i \cdot m_i \cdot n_i$, and where $S_f$ equals C/P.

In a fifth aspect of the invention, the invention provides a data processing system comprising means for carrying out the computer-implemented method.

In a sixth aspect of the invention, the invention provides a computer-readable storage medium comprising instructions which, when executed by a computer system, causes the computer system to carry out the computer-implemented method.

Other advantageous features will be apparent from the accompanying claims.

BRIEF DESCRIPTION OF THE DRAWINGS

To make the invention more readily understandable, the discussion that follows will refer to the accompanying drawings, in which.

DETAILED DESCRIPTION OF THE INVENTION

In the following, general embodiments as well as exemplary embodiments of the invention will be described. References and possible numerals will be made to the accompanying drawings. It shall be noted, however, that the drawings are exemplary embodiments only, and that other features and embodiments may well be within the scope of the invention as described.

The present invention relates to a snoop filter device, a node controller, a multicomponent computer system, a computer-implemented method, a data processing system and a computer-readable storage medium aiming at enabling improved tracking of a variable number of cache elements in multiprocessor systems.

In a first aspect of the invention, the invention provides a snoop filter device for being organized to track a variable C number of cache elements. Here, the snoop filter device is connectable to C cache elements, directly or indirectly.

Figure 1A:
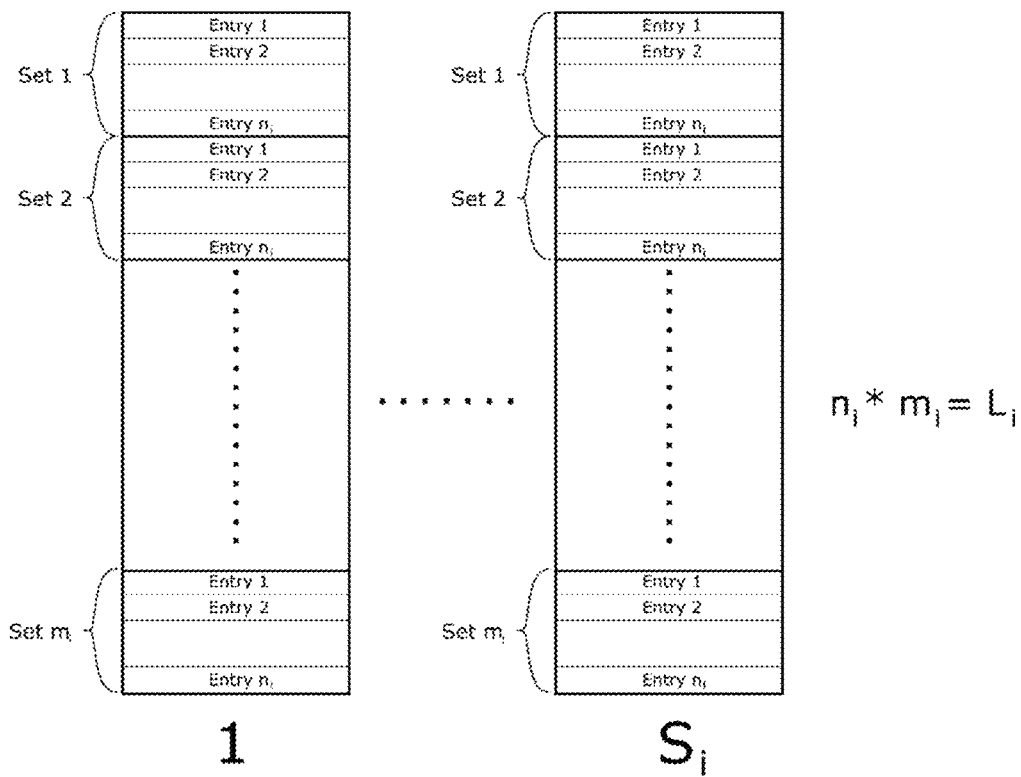
FIG. 1a is a schematic illustration of a snoop filter device that comprises an $S_i$ number of initial snoop filter instances, where each initial snoop filter instance comprises an $L_i$ number of snoop filter storage locations.

FIG. 1a schematically illustrates a snoop filter device that comprises $S_i$ initial snoop filter instances. $S_i$ being a real positive integer. Here, each initial snoop filter instance comprises an $L_i$ number of snoop filter storage locations.

The $L_i$ snoop filter storage locations are organized in an $n_i$-way set associative manner, meaning that the snoop filter device follows an entry placement policy similar to that of a set-associative cache. The $n_i$-way set associative organization means as illustrated in FIG. 1a that each initial snoop filter instance may be imagined as an $n_i \cdot m_i$ matrix of storage locations, where $m_i$ being the number of sets and $n_i$ being the number of storage locations per set. $n_i$ can in other words be said to be the number of ways and each initial snoop filter instance may thus be said to be an $n_i$-way set associative snoop filter. The total number of storage locations in each initial snoop filter instance equals $L_i$. $L_i$ equals according to the invention $m_i \times n_i$ storage locations.

Figure 1B:
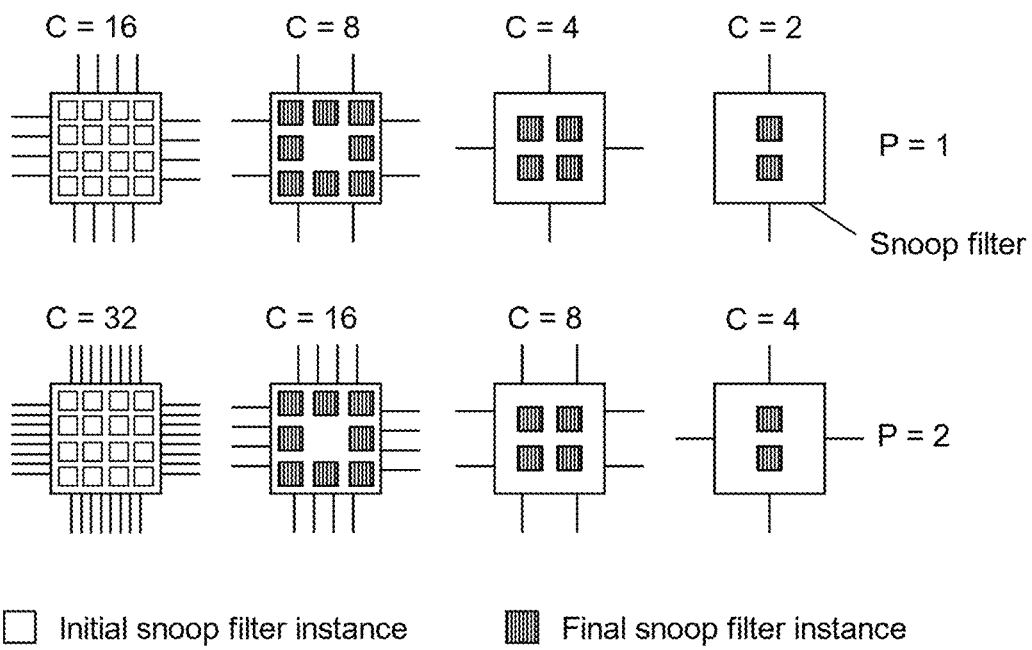
FIG. 1b is a schematic illustration of a snoop filter device connectable with C number of cache elements.

FIG. 1b illustrates a snoop filter device connectable to C cache elements, C being a real positive integer. The connection may be a direct connection, e.g., via a bus, or indirectly, e.g., via components such as routers, node controllers etc. C may for example be a real positive integer being a power of 2, but can in principle be any real positive number. The snoop filter device is according to the invention configured to be organized when the snoop filter device is connected to C cache elements. Said organization is performed by grouping initial snoop filter instances together into an $S_f$ number of final snoop filter instances, meaning that $S_f$ consequently will be smaller than $S_i$, e.g., such that $2^x S_f = S_i$, $x = \{1,2,3,\ldots\}$. The snoop filter device may thus be said to be configured to group initial snoop filter instances together into an $S_f$ number of final snoop filter instances. A person skilled in the art will appreciate that the snoop filter device here may be considered as specially adapted to group initial snoop filter instances together into an $S_f$ number of final snoop filter instances. The snoop filter device may alternatively be operated by a separate agent, e.g., a CPU or node controller, that may be considered as specially adapted to group initial snoop filter instances together into an $S_f$ number of final snoop filter instances. Grouping of initial snoop filter instances may be implemented by programming the snoop filter device, or the agent operating the snoop filter device, to perform the grouping, e.g., at a software or hardware level. Organization is in the context of the present invention considered as an equivalent term as reorganization and the two terms may be used interchangeably herein.

Figure 2A:
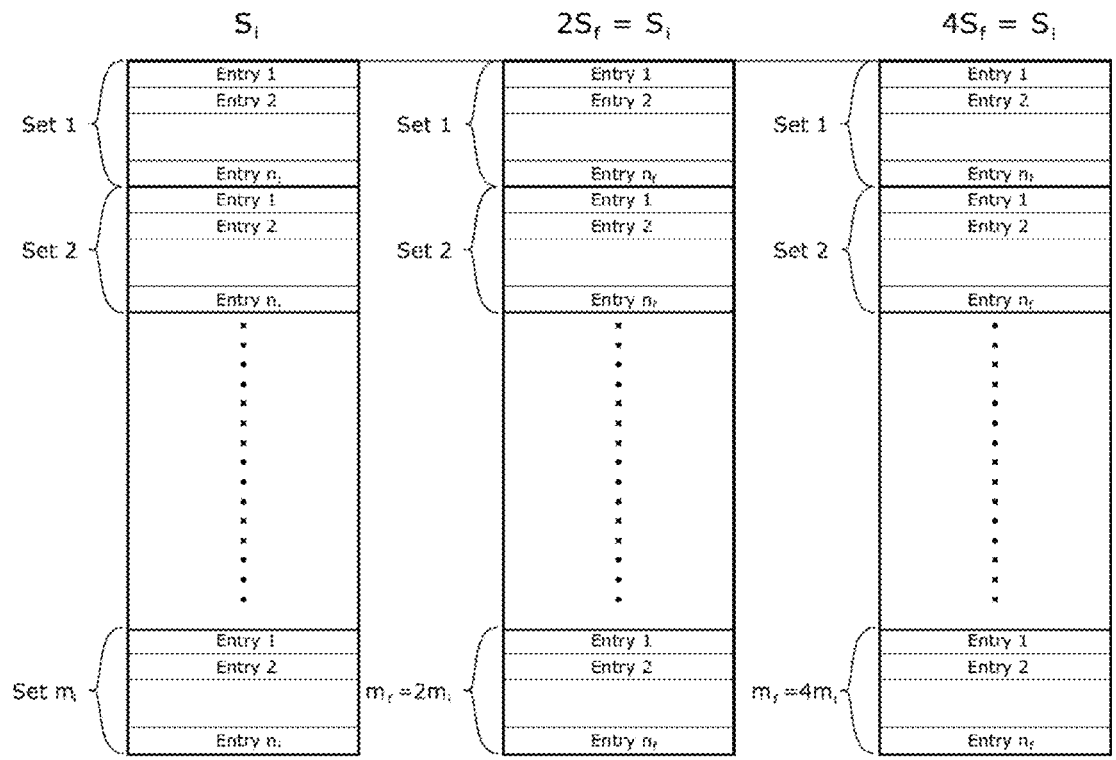
FIG. 2a-c are schematic illustrations of a snoop filter device where $S_i$ initial snoop filter instances are organized into $S_f$ final snoop filter instance, where each final snoop filter instance is organized in an $n_f$-way set associative manner.
Figure 2B:
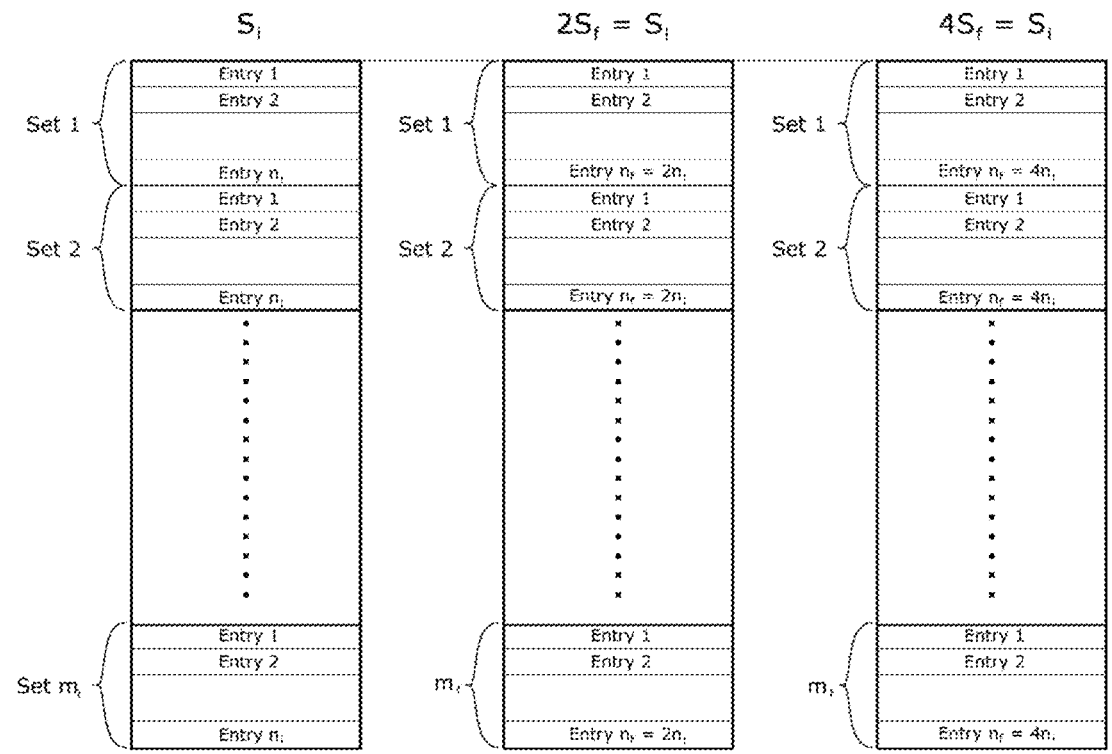
Figure 2C:
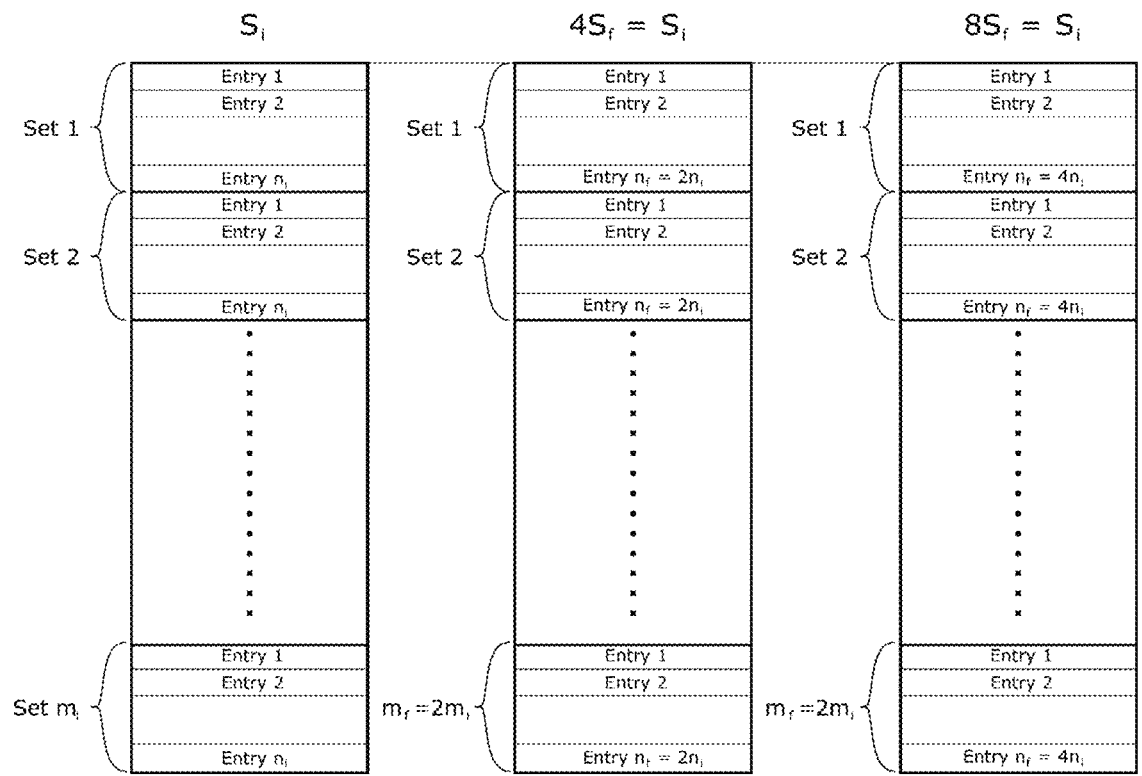

Each of the $S_f$ number of final snoop filter instances comprises according to the invention an $L_f$ number of snoop filter storage locations, where the $L_f$ snoop filter storage locations are organized in an $n_f$-way set associative manner. As for the initial snoop filter instances the latter means that the snoop filter device, after grouping of initial snoop filter instances, follows an entry placement policy similar to that of a set-associative cache. FIGS. 2a-2c illustrates a final snoop filter instance that is organized in an $n_f$-way set associative manner. The $n_f$-way set associative organization means that each final snoop filter instance may be imagined as an $n_f \cdot m_f$ matrix of storage locations, where $m_f$ being the number of sets and $n_f$ being the number of storage locations per set. $n_f$ can in other words be said to be the number of ways and each final snoop filter instance may thus be said to be an $n_f$-way set associative snoop filter. The total number of storage locations in each final snoop filter instance equals $L_f$. $L_f$ equals according to the invention $m_i \times n_i$ total number of storage locations.

It will be appreciated by a person skilled in the art that any snoop filter instance, being an initial snoop filter instance or final snoop filter instance may be considered structured fully associatively, in a direct mapped manner, or in a set-associative manner based on the exact values $n_{i,f}$ and $m_{i,f}$. This structuring means that the snoop filter device may follow an entry placement policy similar to that of a fully associative cache, direct mapped cache or a set-associative cache respectively. As a way of example, an $n_{example1}$-way set associative snoop filter instance will be direct-mapped in the case of $n_{example1}$ being equal to 1 and $m_{example1}$ being equal to the number of storage locations in the snoop filter instance. Another example would be an $n_{example2}$-way set associative snoop filter instance that will be fully associative in the case of $n_{example2}$ being equal to the number of storage locations in the snoop filter instance and $m_{example2}$ being equal to 1.

Any snoop filter instance, that being an initial snoop filter instance or final snoop filter instance, may according to the invention be considered as having the same functionality as a general snoop filter. A general snoop filter may here be considered as an independent snoop filter, e.g., a snoop filter comprising only one instance. A directory of a snoop filter instance may according to any embodiment of the present invention be considered comprising the storage locations of that snoop filter instance. Each snoop filter instance is configured to operate in parallel with any other snoop filter instance, e.g., synchronously or asynchronously.

It will be appreciated by a person skilled in the art that the storage locations of any snoop filter instance, that being an initial snoop filter instance or final snoop filter instance, may be considered as making up a registry. The registry may consequently be considered as configured to store a number of snoop filter entries, with one entry per storage location. An entry may be considered as the information stored in a storage location.

Figure 5:
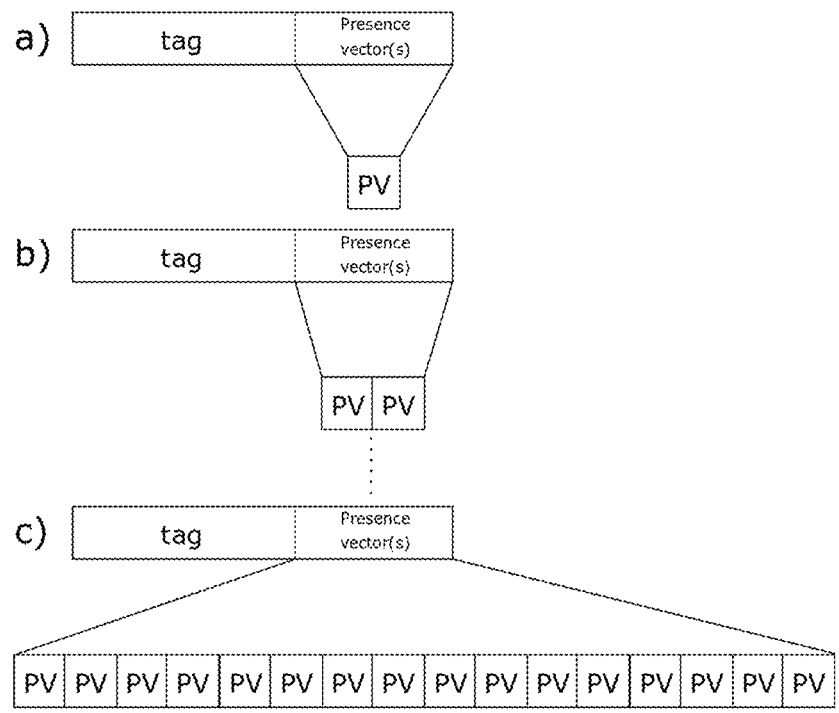
FIG. 5 is a schematic illustration of a snoop filter storage location according to the invention that is configured to store a tag identifying a cache line storable in a cache element, and to store P presence vectors.

FIG. 5 schematically illustrates a snoop filter storage location according to the invention that is configured to store a tag identifying a cache line storable in a cache element, and to store P presence vectors. Item a) of FIG. 5 shows storage of one presence vector, item b) of FIG. 5 shows storage of two presence vectors and item c) of FIG. 5 shows storage of 16 presence vectors in an entry. A tag and a presence vector stored in the same storage location of a snoop filter instance may according to any embodiment of the invention be considered as being associated with each other.

Figure 3:
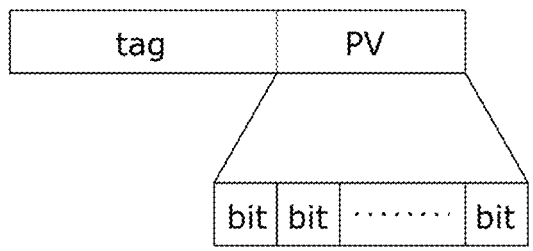
FIG. 3 is a schematic illustration of a presence vector comprising a plurality of bits and a presence vector comprising one bit.
Figure 3:
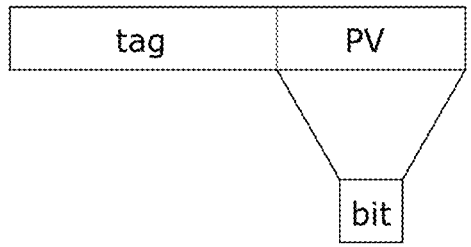

A presence vector may in short be interpreted as at least one bit that contains information regarding whether the cache line identified by the tag stored in the same storage location as said presence vector is present in a given cache element. A presence vector may in addition contain an identifier for the said cache line. FIG. 3 is a schematic illustration of a presence vector where item a of FIG. 3 comprises one bit and item b of FIG. 3 comprises a plurality of bits. The number of presence vectors P in each storage location is according to the invention a constant number. P does in other word not change with the reorganization of the snoop filter device, i.e., P does not scale with C. The number P may e.g., be chosen when fabricating the snoop filter device, or be chosen when configuring the snoop filter device, e.g., during a rebooting operation.

The number of presence vectors P storable in each snoop filter storage location is according to the invention a real positive integer, e.g., a real positive integer number to the power of 2. The P number of presence vectors storable in each snoop filter storage location is according to one embodiment of the invention smaller or equal to 16. P may be equal to 1, or alternatively be equal to 2. FIG. 5 illustrates three examples of a snoop filter entry, one where P=1, one where P=2 and one where P=16.

A tag may in the context of the present invention be considered as a unique identifier of a cache line and is typically included as at least part of a cache line address. A cache line address may additionally comprise any one or more of an index, an offset, flag bits, and any number of state bits etc. A cache line address or a part of a cache line address may together with a cache block constitute a cache line. A cache line comprises in other words at least a cache block and optionally at least parts of a cache line address. A tag can according to any embodiment of the invention be considered as associated with the cache line that it identifies.

The snoop filter device is as illustrated in FIG. 2 configured to be organized by grouping initial snoop filter instances together into an $S_f$ number of final snoop filter instances, e.g., such that $2^x \cdot S_f = S_i$, $x = \{1,2,3, \ldots \}$. In the snoop filter instance in the middle of FIG. 2a $2S_f = S_i$ which means that the number of sets are reduced so $2m_i = m_f$. In the rightmost snoop filter instance $2^x S_f = S_i$, where $x = 2$ and consequently $4S_f = S_i$ and thus $4m_i = m_f$. In the middle of FIG. 2b each set of the final snoop filter instance comprises a double number of entries, i.e., $n_f = 2n_i$, thus $m_i = m_f$ and $2S_f = S_i$. In the rightmost figure $n_f = 4n_i$ and $4S_f = S_i$. The snoop filter device may in other words be considered as being organized from an initial snoop filter organization to a final snoop filter organization. The initial snoop filter organization may thus be defined by the parameters $S_i$, $m_i$ and $n_i$, while the final snoop filter organization may be defined by the parameters $S_f$, $m_f$ and $n_f$. The grouping of initial snoop filter instances into a number of final snoop filter instances will result in the number of final snoop filter instances $S_f$ being smaller than the number of initial snoop filter instances $S_i$. The number of storage locations in the snoop filter device will, however, remain the same such that $L_i = m_i \times n_i = L_f = m_f \times n_f$. The organization of the snoop filter device will thus be made in such a manner that the product $S_f \cdot m_f \cdot n_f$ equals $S_i \cdot m_i \cdot n_i$.

Each snoop filter instance of the snoop filter device, that being an initial snoop filter instance or a final snoop filter instance, may according to the invention store any individual given tag in maximum one of its storage locations. As the storage location storing the given tag will also store P different presence vectors, i.e., P presence vectors associated with the given tag, each snoop filter instance will consequently hold information regarding the presence of the cache line identified by the given tag in P separate cache elements. One may in other words say that each snoop filter instance may track P separate cache elements for each tag. As the snoop filter device comprises an $S_i$ or $S_f$ number of snoop filter instances, the snoop filter device as a whole may consequently hold information regarding the presence of a given cache line identified by a given tag in $P \cdot S_{i,f}$ separate cache elements. Each snoop filter instance may thus track $P \cdot S_{i,f}$ separate cache elements for each tag.

Figure 6:
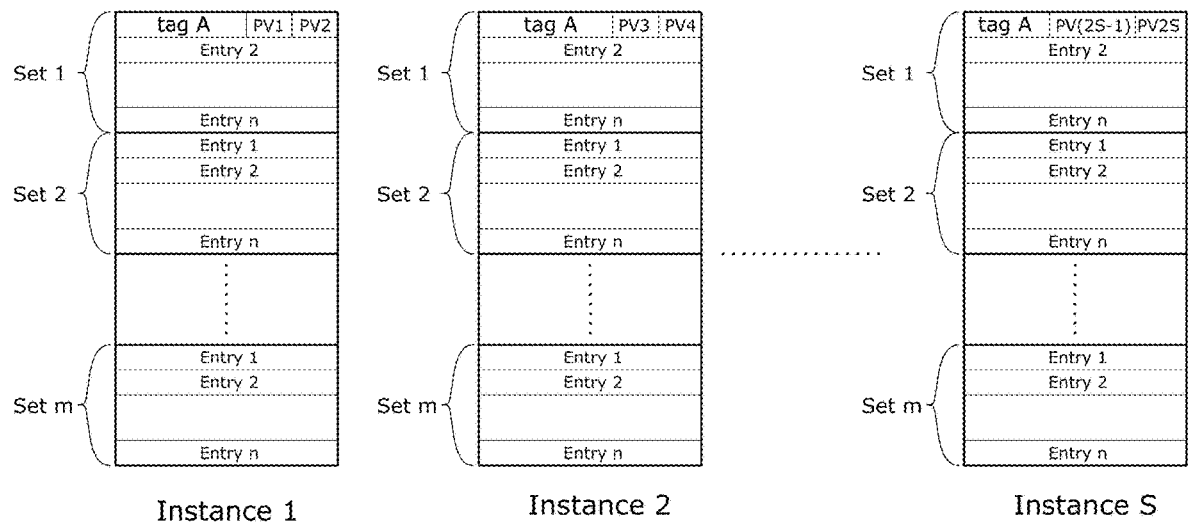
FIG. 6 is a schematic illustration of a snoop filter device comprising S snoop filter instances where a tag, tag A, is stored in each of the snoop filter instances.
Figure 7:
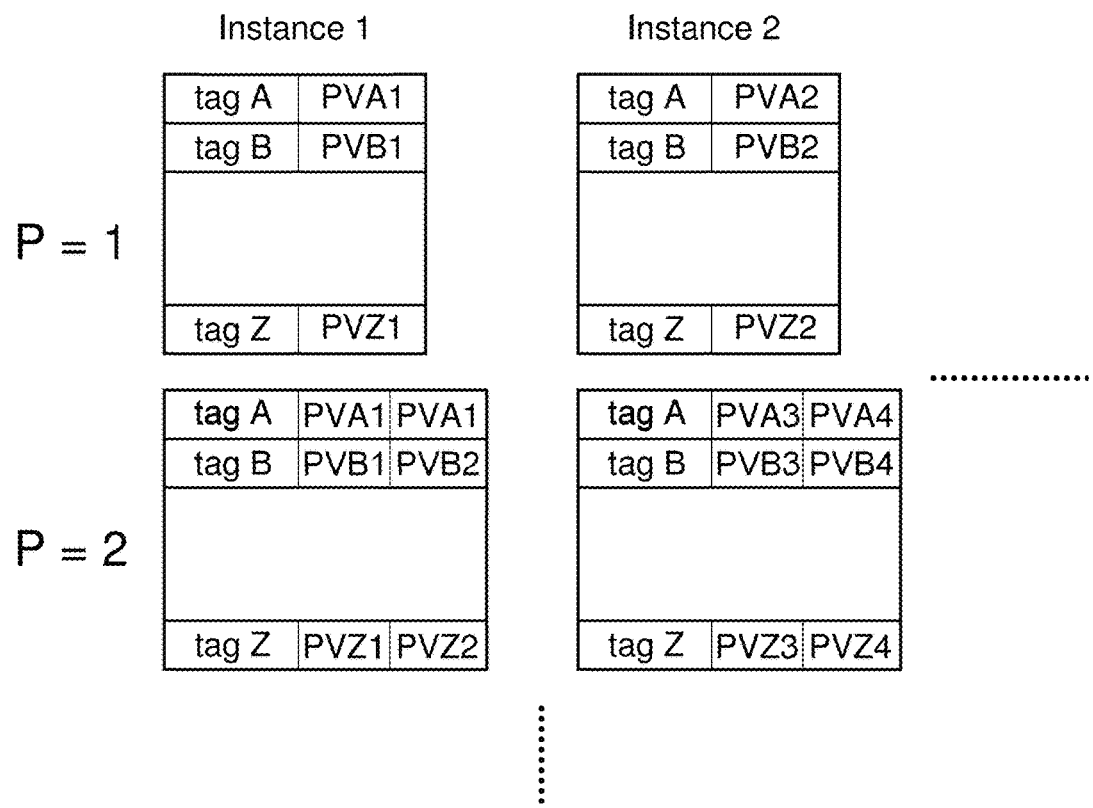
FIG. 7 is a schematic illustration of a snoop filter device comprising a plurality of snoop filter instances where tags, tag A, B and Z, are stored in each of the snoop filter instances.

A storage location of one snoop filter instance may store a given tag that is also stored in a storage location of another snoop filter instance. The entries in the two different instances, each comprising the same tag, may further comprise different presence vectors. The snoop filter device according to this invention may therefore track more cache elements that are storing a cache line identified by a single tag compared to a conventional snoop filter device. FIG. 6 is a schematic illustration of a snoop filter device comprising S snoop filter instances where a tag, tag A, is stored in each of the S snoop filter instances. The tag A is here associated with two separate presence vectors for each snoop filter instance meaning that the snoop filter device may track a maximum of $2 \cdot S$ cache elements where the cache line identified by tag A is stored. FIG. 7 is a schematic illustration of a snoop filter device comprising a plurality of snoop filter instances where separate tags, tag A, B and Z, are stored in each of the snoop filter instances. The number of cache elements that the snoop filter device can track may in FIG. 7 be seen to depend on the number of presence vectors in each storage location.

With P being constant, a snoop filter device may according to the invention maximally hold information regarding the presence of a given cache line identified by a given tag in $P \cdot S_i$ separate cache elements. One may in other words say that a snoop filter device may track a maximum of $P \cdot S_i$ separate cache elements for each tag. The snoop filter device may through grouping of snoop filter instances be organized to track fewer separate cache elements for each tag than $P \cdot S_i$. A snoop filter device being organized with $S_f < S_i$ snoop filter instances may consequently track a maximum of $P \cdot S_f < P \cdot S_i$ separate cache elements for each tag. A snoop filter device according to the invention may consequently track a variable number C of cache elements. As a way of example, a snoop filter device installed as a component in a computing system that comprises fewer cache elements $C_{example}$ than $P \cdot S_i$ may group its initial snoop filter instances together in order to organize the snoop filer according to the number $C_{example}$, i.e., such that $P \cdot S_f = C_{example}$ or at least such that $P \cdot S_f < C_{example} < P \cdot S_i$. Such grouping will allow for larger final snoop filter instances in the final organization of the snoop filter device, i.e., more sets and/or ways in each final snoop filter instance than in the initial snoop filter organization. The initial snoop filter organization may in this example in the event where grouping is not performed have idle snoop filter instances and the snoop filter instances in use will here be smaller than they could optionally have been. The number of final snoop filter instances $S_f$ may thus according to the invention be determined from the number of cache elements connected to the snoop filter device, C, and the number of presence vectors in each storage location $P \cdot S_f$ may thus scale, or in other words vary, with C and P such that $S_f = C/P$.

The snoop filter device according to the present invention is connectable to a number of cache elements C. Each cache element may further be considered as comprising a number of cache agents, and a cache element may as a whole be referred to as an agent, i.e., for example a proxy agent. A cache element may in the context of the present invention be interpreted as an arbitrary collection of cache agents. A cache element may e.g., be interpreted as comprising any number of cache agents, e.g., an integer number of cache agents, or a fractional number of cache agents. An example of a cache element may thus be half a cache agent, one cache agent, two cache agents, one whole cache agent plus half of another cache agent etc. Cache agents in each cache element may be connected directly, collectively or a combination of directly and collectively to the snoop filter device. It will be appreciated by a person skilled in the art that any cache element may be considered as any physical cache unit, fraction of a physical cache unit or group of cache units that is uniquely identified by one cache identifier. A cache identifier is thus according to the invention an identifier for a cache element.

Figure 9:
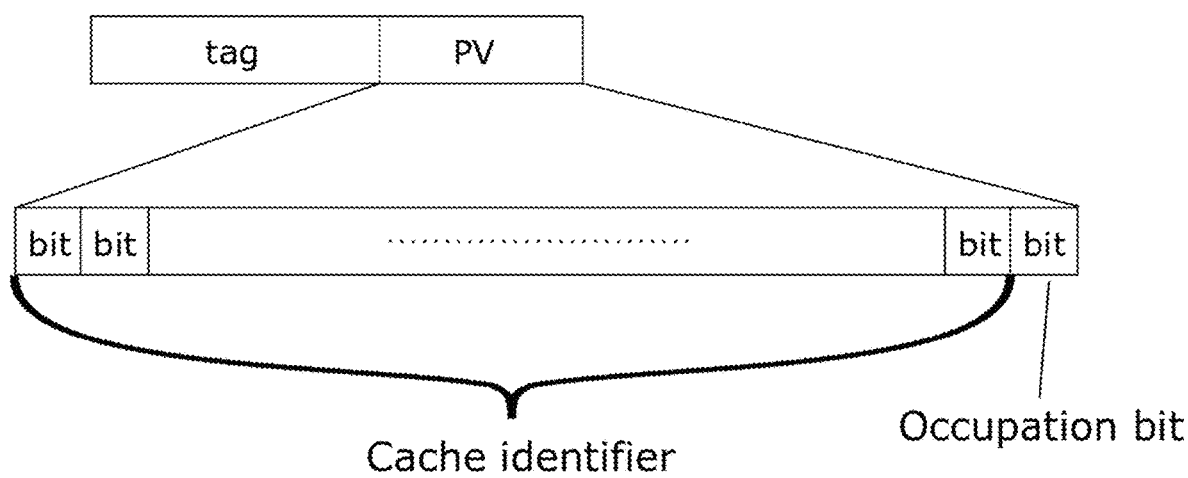
FIG. 9 is a schematic illustration of a presence vector comprising several presence bits sufficient to explicitly express a cache identifier, and one occupation bit.

FIG. 9 is a schematic illustration of a presence vector comprising any number of presence bits, e.g., so that the number of presence bits in each presence vector is sufficient to explicitly express a cache identifier. A presence vector may additionally or alternatively comprise one occupation bit. The occupation bit may be set true if a cache line identified by the tag associated with said presence vector is present at the cache element represented by the cache identifier, and false if the cache line is not present.

Figure 8:
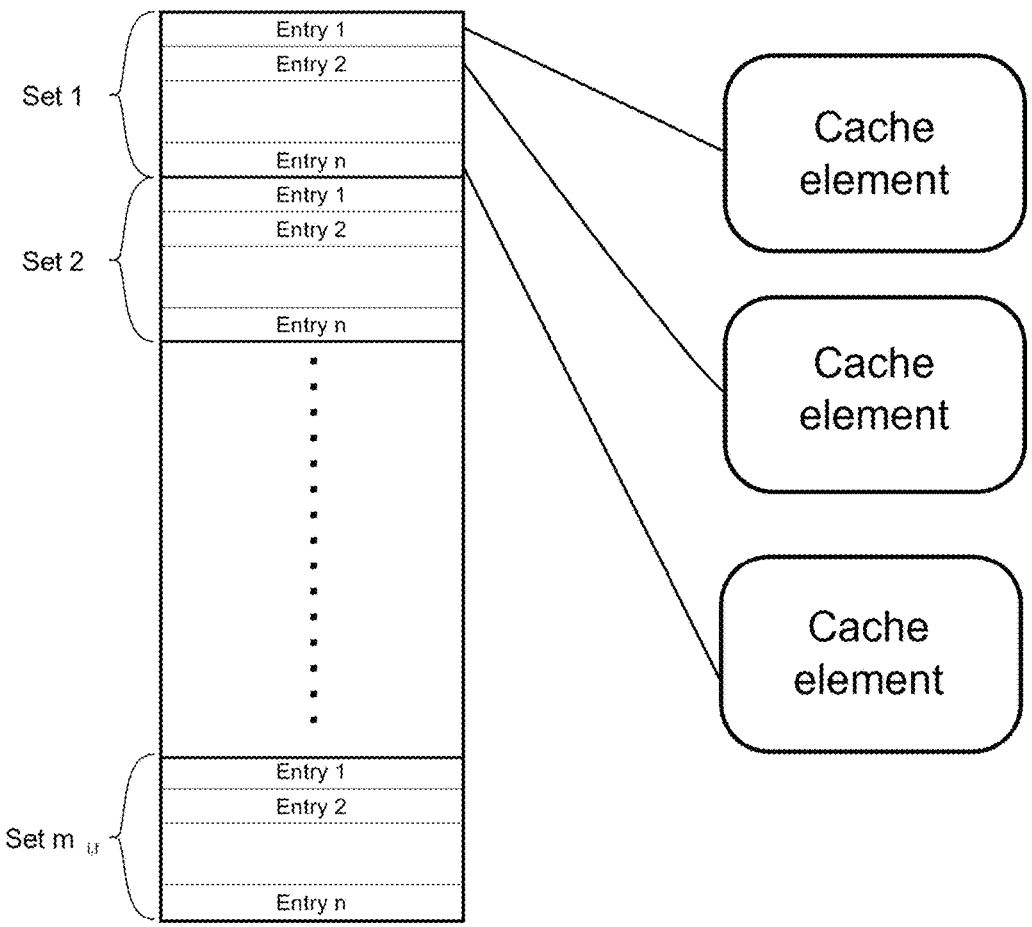
FIG. 8 is a schematic illustration of a snoop filter instance where each snoop filter storage location is mapped to one cache element.

FIG. 8 is a schematic illustration of a snoop filter instance where each snoop filter storage location is mapped to one cache element. Each snoop filter storage location of a snoop filter device may according to any embodiment of the present invention be mapped to one cache element. This mapping means that any one snoop filter storage location may only track the cache element to which it is mapped. Any one snoop filter storage location may in other words only contain information that relates to cache lines that are stored in the cache element to which that snoop filter storage location is mapped. Each snoop filter storage location may thus be said to be bijectively mapped to one cache element. A snoop filter storage location storing a given tag may consequently indicate that the cache element to which that snoop filter storage location is mapped holds a copy of the cache line identified by that tag. The same snoop filter storage location may consequently not contain any information regarding which part of the cache element, e.g., which specific cache agent, that holds a copy of the cache line. The same snoop filter storage location may not contain information regarding the presence of the cache line in other cache elements in the system. Each snoop filter storage location of the snoop filter device may according to any embodiment of the invention be considered as being configured to be mapped to one cache element each. Multiple snoop filter storage locations may each be mapped to the same cache element. This means that the snoop filter device may employ multiple snoop filter storage locations to track multiple cache lines in one cache element.

A snoop filter device is according to one embodiment of the invention designed such that each snoop filter storage location is implicitly mapped to one cache element. Each snoop filter storage location is in this case implicitly mapped to one cache element each via a storage location in a snoop filter instance. This mapping may be hardwired, firmware-integrated and/or software-integrated. Consequently, any presence bits constituting a presence vector may not have to explicitly express the cache identifier for the cache element. The number of presence bits per presence vector may be one bit that indicates whether the cache element identified by the cache identifier holds a copy of a certain cache line. The one presence bit is be set true if a cache line identified by the tag associated with said presence bit is present at the cache element to which the storage location of the presence bit is mapped, and false if the cache line is not present.

Each storage location of the snoop filter device is according to the invention configured to store snoop filter entries with the same format. The format of a snoop filter entry is determined by which type of storage location elements the entry comprises and the number of bits allocated to each storage location element. Examples of such storage location elements are: a tag, one or more presence vectors, one or more state bits, etc. The format of a snoop filter entry is also determined by the number of bits allocated to each storage location element, e.g., the number of tag bits and the number of presence bits per presence vector. Two snoop filter entries with the same format thus comprise the same type of storage location elements with the same number of bits allocated to each storage location element. FIG. 3 illustrates a snoop filter entry comprising one presence vector, where the presence vector comprises a plurality of bits (FIG. 3a) and where the presence vector consists of one bit (FIG. 3b).

A snoop filter device can be considered as a device that monitors data traffic to keep track of the coherency state of data blocks belonging to various cache lines. The monitored data traffic may comprise information in the form of at least parts of a cache line address, e.g., information that a certain cache line is being modified. A cache line address may comprise a tag and a k-bit index, where at least a part of the k bits are used to determine/index which set in a set associative snoop filter instance that contains an entry with the index's appurtenant, i.e., associated, tag. A tag belonging to a certain cache line address can in this case only be stored as a part of an entry in a set of a set associative snoop filter instance indicated by the index of that cache line address. A cache line may thus in other word be associated with a set in an instance via the index of its cache line address.

Figure 4:
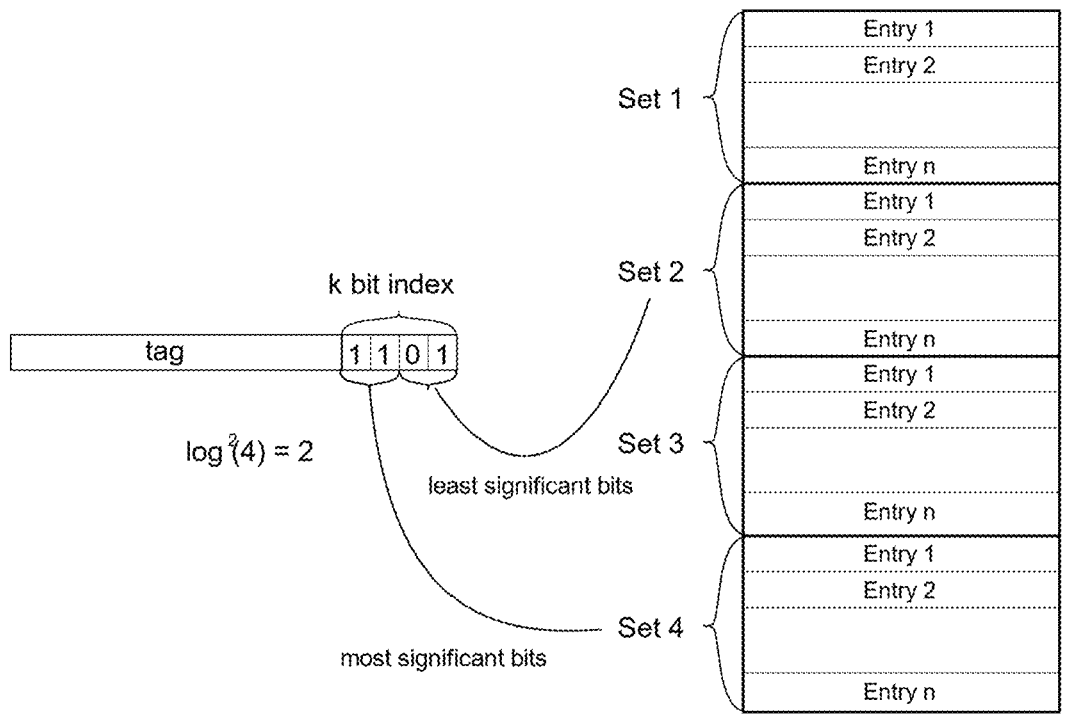
FIG. 4 schematically illustrates that a tag of a given cache line address may be stored in a set of a snoop filter instance indicated by at least parts of a k bit index of that given cache line address.

A cache line address may, as illustrated in FIG. 4, comprise a tag and a k-bit index, where at least a part of the k-bit index may be used to determine/index which set in a snoop filter instance that contains an entry holding the index's appurtenant, i.e., associated, tag. A 4-bit index can for example index 16 different sets, while an 8-bit index can index 256 different sets. In some cases, e.g. as illustrated in FIG. 4, a cache line comprises a k-bit index where $2^k > m_{i,f}$, meaning that the full index of the cache line address may indicate a set which does not exist in snoop filter instance. Any snoop filter instance of the snoop filter device may, when $2^k > m_{i,f}$, therefore store the tag associated with the k bit index in a set indicated by the $\log_2 (m_{i,f})$ least or most significant bits of the k bit index. The length k of the index may be determined by various system parameters, such as the associativity of various agents, e.g., cache elements or snoop filter agents. The degree of associativity here means the value of n in an n-way set associative agent. An agent being direct mapped has as previously described an associativity n=1, an agent being two-way set associative has an associativity n=2, an agent being four-way set associative has an associativity n=4, and so on.

A snoop filter device may, as schematically illustrated in FIG. 2, be fabricated with an initial number $S_i$ of snoop filter instances implemented in the snoop filter device. This initial number of snoop filter instances may e.g., be hardware or software implemented and determines the maximal number of snoop filter instances that the snoop filter device can comprise. An example of such a snoop filter device is an ASIC-based snoop filter device fabricated with an initial number of physically implemented instances. The initial number of snoop filter instances may be any power of two, e.g., 8, 16, 32, 64, or 128.

The snoop filter device may according to an embodiment of the invention be driven by a separate unit, e.g., a node controller or a CPU. Said unit may be configured to operate the initial snoop filter instances fully independently or to operate groups of two or more final snoop filter instances simultaneously as if they were one instance. The unit driving the snoop filter device may, in order to track the maximum number of cache elements, operate each of the $S_i$ initial snoop filter instances individually. As each snoop filter instance can track P number of cache elements per tag, the maximal number $C_{max}$ of cache elements that a snoop filter device can track in this case becomes $C_{max} = P \cdot S_i$. If it is desirable to track a number of cache elements that is lower than the maximum $C_{max}$, the unit driving the snoop filter device may group multiple initial snoop filter instances into $S_f$ larger final instances, i.e., effective instances. Grouping of snoop filter instances may in practice be done for example through address interleaving.

As an example, a snoop filter device may be designed with an initial number $S_i$ of initial snoop filter instances with $m_i$ sets in each initial instance and with $n_i$ storage locations per set in each initial instance. $S_i$, $m_i$, and $n_i$ may here be any positive integer, e.g., $S_i = 2^g$, where $g = \{1, 2, \ldots\}$, $m_i = 2^h$, where $h = \{0, 1, 2, \ldots\}$ and $n_i = 2^j$, where $j = \{0, 1, 2, \ldots\}$.

The snoop filter device is as here described configured to track a maximum $C_{max}$ number of cache elements, where $C_{max}$=P. $S_i$. The snoop filter device may track a number $C<C_{max}$ of cache elements by grouping multiple initial snoop filter instances together. If it for example is desirable to track $C=C_{max}/2$ cache elements with a snoop filter device designed with $S_i$ number of initial snoop filter instances, the snoop filter device, or component driving the snoop filter device, may e.g., group two and two initial snoop filter instances together. In the latter case the snoop filter device would end up with an $S_f=S_i/2$ number of final snoop filter instances. $n_f$ and $m_f$ will be determined according to the equation $S_f \cdot m_f \cdot n_f = S_i \cdot m_i \cdot n_i$, meaning in this example that $m_f \times n_f = 2 m_i \times n_i$. If for example $m_f = m_i$, then $n_f = 2 \cdot n_i$, or if $n_f = n_i$, then $m_f = 2 \cdot m_i$.

$S_i$, $m_i$, and $n_i$ may according to any embodiment of the invention each be any positive integers, e.g., $S_i = 2^g$, where g={1, 2, . . . }, $m_i = 2^h$, where h={0, 1, 2, . . . } and $n_i = 2^j$, where j={0, 1, 2, . . . }. $m_i$ may e.g., be in the order of hundred, thousand or ten thousand. $n_i$ may e.g., be in the order of hundred, thousand or ten thousand. $S_i$ may e.g., be equal 8, 16, 32, 64, 128 or 256.

Figure 10:
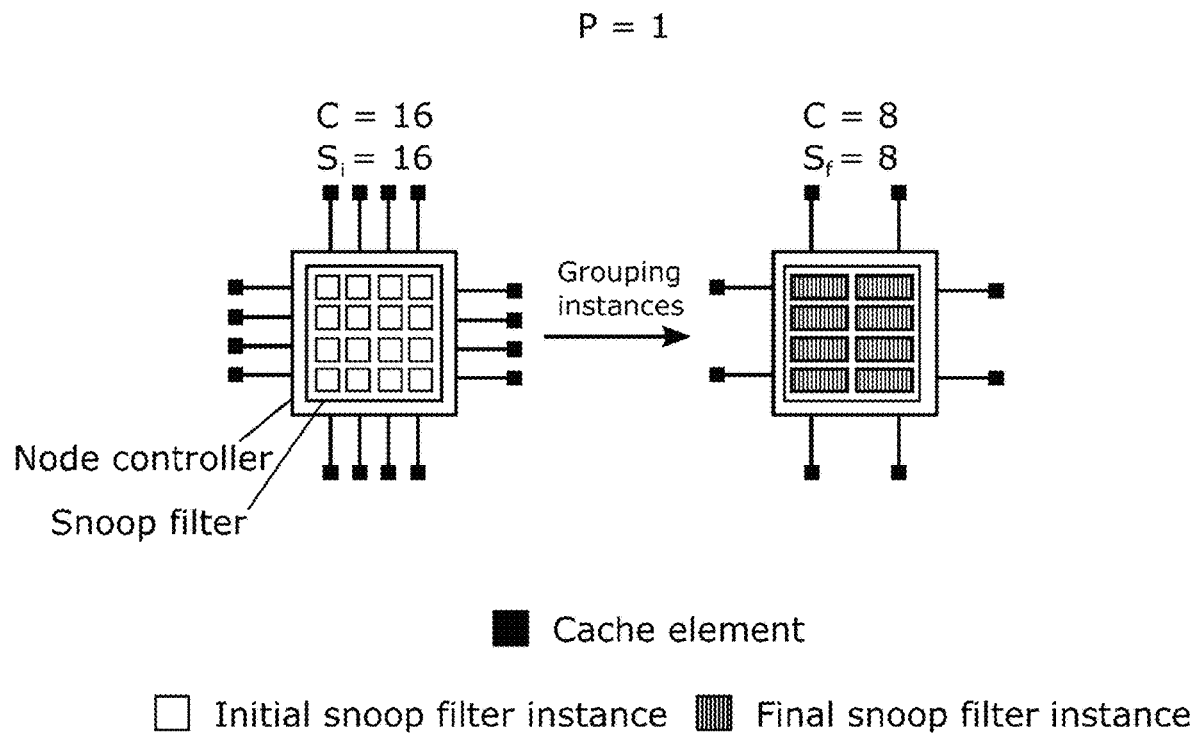
FIG. 10 illustrates a node controller comprising a snoop filter device.
Figure 11:
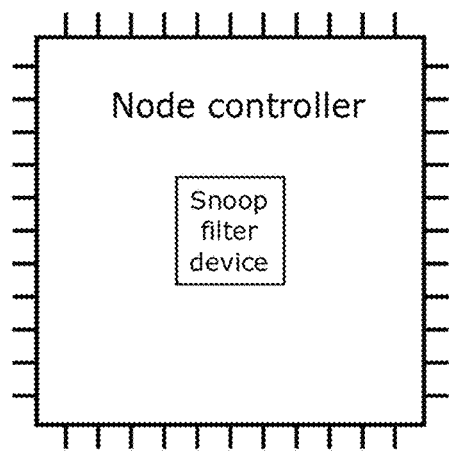
FIG. 11 illustrates a node controller comprising a snoop filter device.

FIGS. 10 and 11 illustrates a node controller comprising a snoop filter device. The node controller may be configured to drive a snoop filter device and may be configured to group initial snoop filter instance in the snoop filter device into final snoop filter instances. The snoop filter device may here be connected to C cache elements via the node controller.

Figure 12:
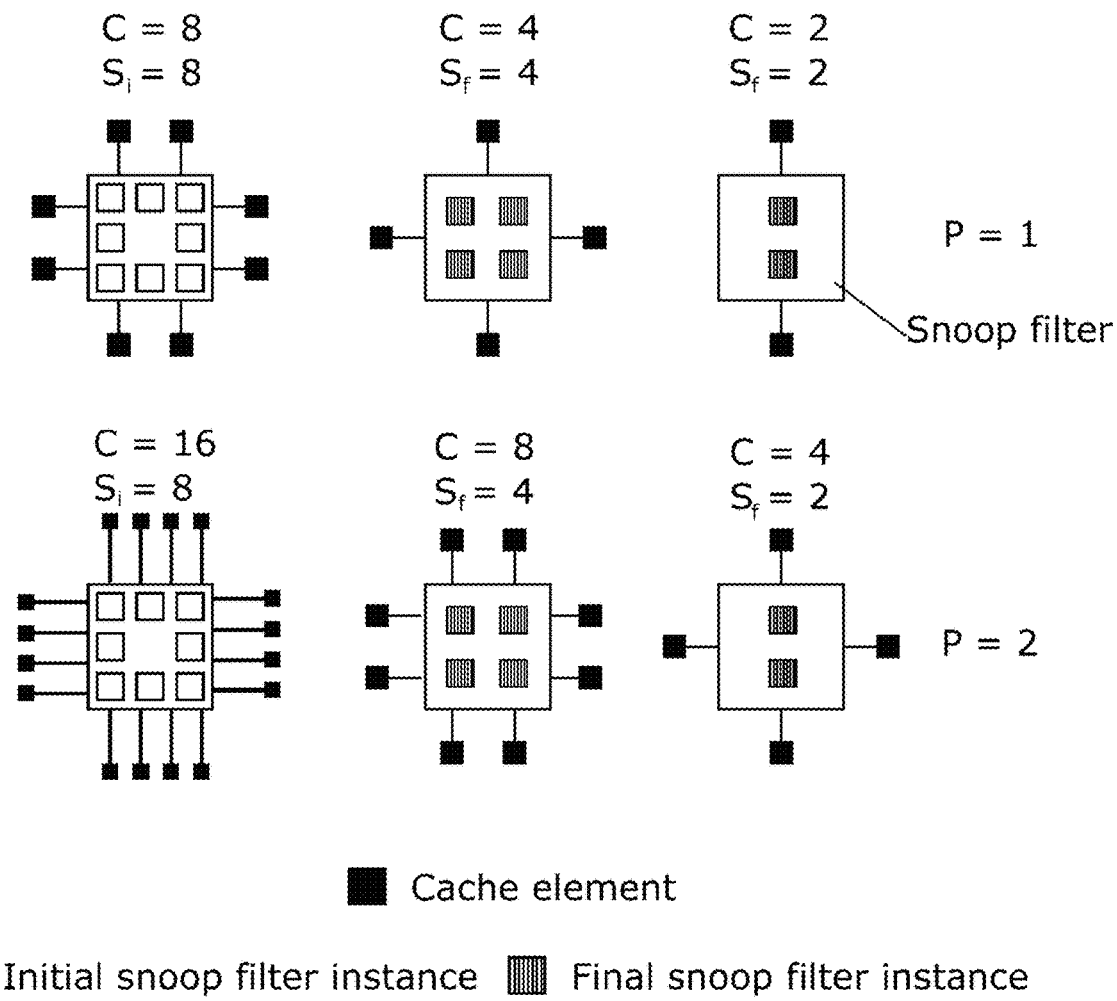
FIG. 12 illustrates a multicomponent computer system comprising a C number of cache elements, and a snoop filter device connected with the C cache elements.
Figure 13:
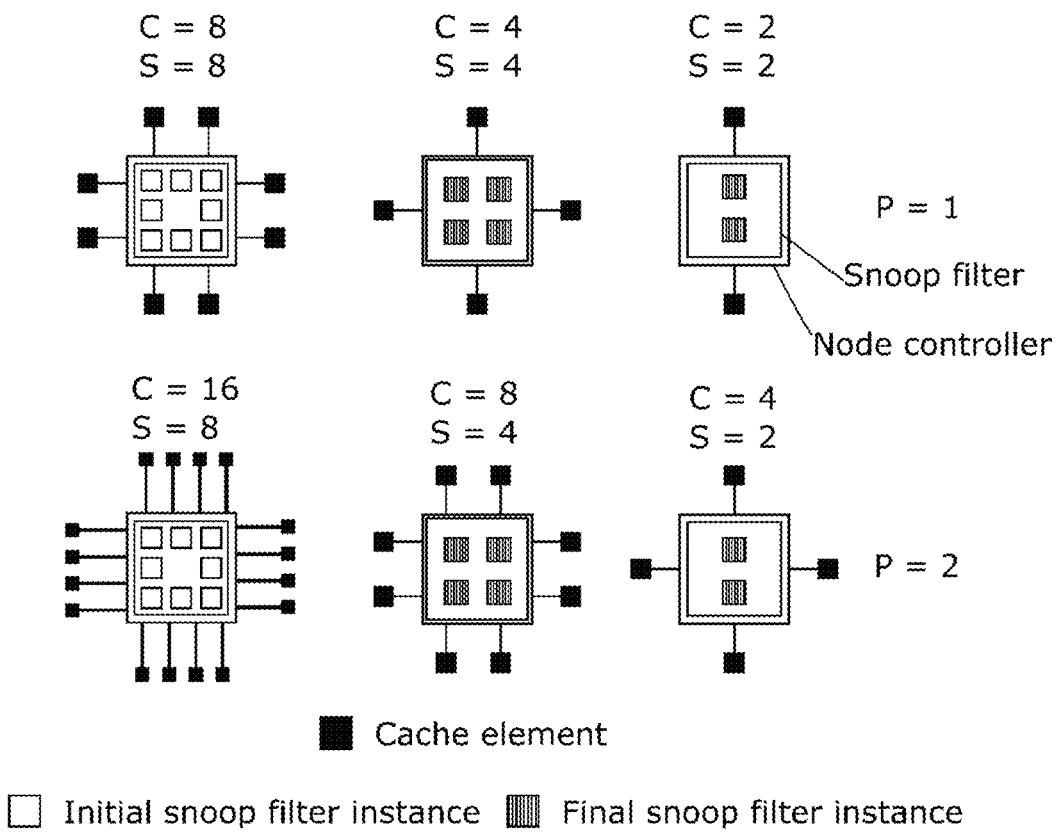
FIG. 13 illustrates a multicomponent computer system comprising a C number of cache elements, and a node controller comprising a snoop filter device, where the node controller is connected with the C cache elements.

FIG. 12 illustrates a multicomponent computer system comprising a C number of cache elements, and a snoop filter device connected with the C cache elements. FIG. 13 illustrates a multicomponent computer system comprising a C number of cache elements, and a node controller comprising a snoop filter device, where the node controller is connected with the C cache elements.

Figure 14:
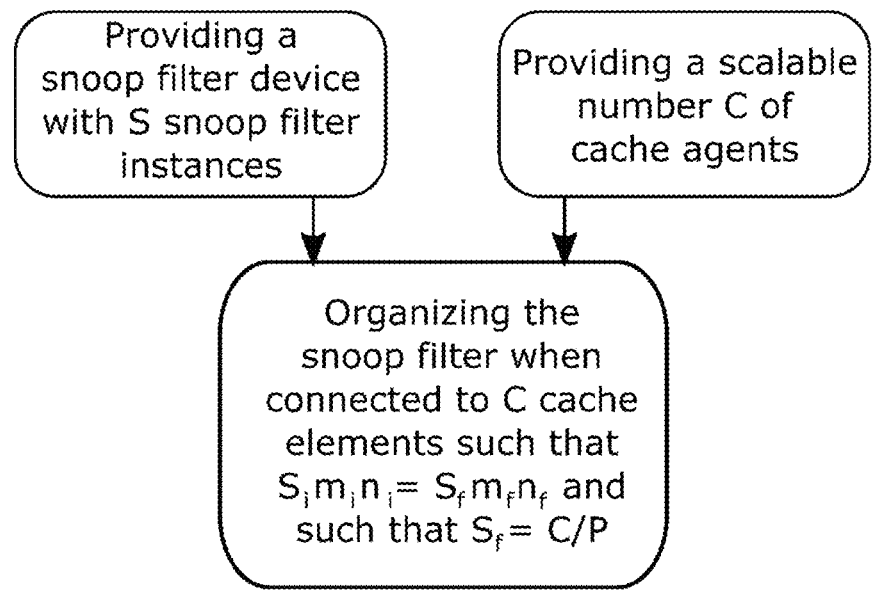
FIG. 14 illustrates a computer-implemented method according to the invention.

FIG. 14 illustrates a computer-implemented method comprising the step of: organizing a snoop filter device according to the first aspect of the invention, when the snoop filter device is connected to a C number of cache elements, such that the product $S_f \cdot m_f \cdot n_f$ equals the product $S_i \cdot m_i \cdot n_i$, and where $S_f$ equals C/P. The computer-implemented method may, as appreciated by a person skilled in the art, be performed by suitable means. Suitable means may here be a CPU, group of CPUs, a node controller or other suitable means. The computer-implemented method may be stored as a series of executable instruction on a computer-readable storage medium, e.g. installed in a node controller as schematically illustrated in FIGS. 10 and 11. Said instructions may be executed by a computer system, or a component of a computer system, e.g. a CPU, group of CPUs or a node controller. The execution of said instructions may cause the computer system to carry out said computer-implemented method.

The invention claimed is:

1. A snoop filter device for being organized in order to track a variable C number of cache elements, the snoop filter device comprising:

an $S_i$ number of initial snoop filter instances, wherein:
the snoop filter device is connectable to a C number of cache elements,
the snoop filter device is configured to be organized, when the snoop filter device is connected to the C number of cache elements, by grouping initial snoop filter instances together into an $S_f$ number of final snoop filter instances,
each initial snoop filter instance comprises an $L_i$ number of snoop filter storage locations organized in an $n_i$-way set associative manner with an $m_i$ number of sets and an $n_i$ number of storage locations per set, such that $L_i$ equals $m_i \cdot n_i$,
each final snoop filter instance comprises an $L_f$ number of snoop filter storage locations organized in an $n_f$-way set associative manner with an $m_f$ number of sets and an $n_f$ number of storage locations per set, such that $L_f$ equals $m_f \cdot n_f$,
each snoop filter storage location is configured to store a tag identifying a cache line storable in a cache element, and to store a P number of presence vectors, each presence vector containing information regarding a presence of the cache line identified by the tag, and
a product $S_f \cdot m_f \cdot n_f$ equals a product $S_i \cdot m_i \cdot n_i$, where $S_f \leq S_i$ and where $S_f$ equals C/P.

2. The snoop filter device according to claim 1, wherein:
each cache line comprises a cache line address comprising a given tag and a given k bit cache line index, and
any snoop filter instance of the snoop filter device, when $2^k > m_f$, is configured to store the given tag in a set indicated by a $\log^2 (m_f)$ least or most significant bits of the given k bit cache line index.

3. The snoop filter device according to claim 1, wherein P≤16.

4. The snoop filter device according to claim 3, wherein P=1 or where P=2.

5. The snoop filter device according to claim 1, wherein:
$S_f \geq 2$,
each snoop filter instance among the $S_f$ final snoop filter instances is configured to store same tag in one if its storage locations, and
each of the storage locations of the snoop filter device that stores the same tag are configured to store different presence vectors.

6. The snoop filter device according to claim 1, wherein each snoop filter storage location is mapped to one cache element.

7. The snoop filter device according to claim 1, wherein each presence vector comprises a number of presence bits, and where the number of presence bits is equal to a number of bits required to write a cache element identifier plus one additional bit.

8. The snoop filter device according to claim 1, wherein each presence vector consists of one presence bit.

9. A node controller comprising a snoop filter device according to claim 1.

10. A multicomponent computer system comprising:
a C number of cache elements; and
a snoop filter device according to claim 1 connected with the C cache elements.

11. A computer-implemented method comprising a step of:
organizing a snoop filter device according to claim 1.

12. A data processing system comprising means for carrying out the method of claim 11.

13. A non-transitory computer-readable storage medium comprising instructions which, when executed by a computer system, causes the computer system to carry out the method of claim 11.

14. A multicomponent computer system comprising:
a C number of cache elements; and
a node controller according to claim 9 where the snoop filter device of the node controller is connected with the C cache elements.

* * * * *